(12) United States Patent
Paulessen (10) Patent No.: US 10,356,973 B2
(45) Date of Patent: Jul. 23, 2019

(54) SOIL TILLING APPARATUS HAVING A COMBING OR LEVELING DEVICE

(71) Applicant: Lemken GMBH & Co. KG, Alpen (DE)

(72) Inventor: Georg Paulessen, Viersen (DE)

(73) Assignee: Lemken GMBH & Co. KG (DE)

( * ) Notice: Subject to any disclaimer, the term of this patent is extended or adjusted under 35 U.S.C. 154(b) by 0 days.

(21) Appl. No.: 15/127,287

(22) PCT Filed: Mar. 13, 2015

(86) PCT No.: PCT/DE2015/100104
§ 371 (c)(1),
(2) Date: Sep. 19, 2016

(87) PCT Pub. No.: WO2015/144130
PCT Pub. Date: Oct. 1, 2015

(65) Prior Publication Data
US 2017/0127602 A1    May 11, 2017

(30) Foreign Application Priority Data

Mar. 28, 2014    (DE) .................. 10 2014 104 417

(51) Int. Cl.
*A01B 63/24*    (2006.01)
*A01B 49/02*    (2006.01)
*A01B 63/32*    (2006.01)

(52) U.S. Cl.
CPC ............ *A01B 63/24* (2013.01); *A01B 49/027* (2013.01); *A01B 63/32* (2013.01)

(58) Field of Classification Search
CPC ......... A01B 63/24; A01B 63/32; A01B 63/00; A01B 63/002; A01B 63/008; A01B 63/10; A01B 63/111; A01B 49/027
USPC ....... 172/138, 141, 142, 145, 146, 147, 160, 172/173, 174, 183, 197, 195, 198, 233, 172/234, 264, 266, 605
See application file for complete search history.

(56) References Cited

U.S. PATENT DOCUMENTS

| | | | | | |
|---|---|---|---|---|---|
| 1,930,850 | A | * | 10/1933 | Colca | A01B 19/02 172/141 |
| 2,524,206 | A | * | 10/1950 | Orendorff | A01B 61/00 172/297 |
| 2,737,005 | A | * | 3/1956 | Archer | A01B 19/02 172/634 |
| 2,804,034 | A | * | 8/1957 | Hunter | A01C 23/025 111/120 |

(Continued)

FOREIGN PATENT DOCUMENTS

| CN | 2112922 U | 8/1992 |
|---|---|---|
| CN | 2206536 Y | 9/1995 |

(Continued)

*Primary Examiner* — Jamie L McGowan
(74) *Attorney, Agent, or Firm* — The Watson IP Group, PLC; Jovan N. Jovanovic (57) ABSTRACT

A soil tiling apparatus (1) having a combing or leveling device (4) mounted in front thereof, wherein, when the tool intensity of the combing or leveling device (4) is adjusted, at the same time in the driving direction a change in the distance between the tool supports to each other or to the trailing soil tilling tools (3) is brought about in a simple manner.

12 Claims, 5 Drawing Sheets

(56) References Cited

U.S. PATENT DOCUMENTS

| | | | | |
|---|---|---|---|---|
| 2,947,371 A * | 8/1960 | Rice | ................ | A01B 19/10 |
| | | | | 172/393 |
| 3,043,377 A * | 7/1962 | Urben | ................ | A01B 19/02 |
| | | | | 172/611 |
| 3,106,254 A * | 10/1963 | Clark | ................ | A01B 23/043 |
| | | | | 172/474 |
| 3,314,485 A * | 4/1967 | Godbersen | ................ | A01B 49/02 |
| | | | | 172/142 |
| 3,543,862 A * | 12/1970 | Wenzel | ................ | A01B 61/046 |
| | | | | 172/260.5 |
| 3,765,159 A * | 10/1973 | Neff | ................ | A01B 45/00 |
| | | | | 172/622 |
| 4,091,878 A * | 5/1978 | Steketee | ................ | A01B 29/048 |
| | | | | 172/147 |
| 4,323,126 A * | 4/1982 | Stikeleather | ................ | A01B 79/00 |
| | | | | 172/147 |
| 4,535,849 A * | 8/1985 | Dietrich, Sr. | ................ | A01B 63/32 |
| | | | | 172/166 |
| 4,615,286 A * | 10/1986 | Linton | ................ | A01C 15/005 |
| | | | | 111/52 |
| 4,896,730 A * | 1/1990 | Jarrett | ................ | A01B 19/06 |
| | | | | 172/311 |
| 5,769,170 A * | 6/1998 | Skjaeveland | ................ | A01B 49/06 |
| | | | | 111/52 |
| 6,442,501 B1 * | 8/2002 | Gengler | ................ | G05B 19/409 |
| | | | | 172/7 |
| 6,688,403 B2 * | 2/2004 | Bernhardt | ................ | A01B 69/004 |
| | | | | 172/2 |
| 8,428,831 B2 * | 4/2013 | Thompson | ................ | A01B 69/004 |
| | | | | 172/280 |
| 9,363,938 B1 * | 6/2016 | Slagel | ................ | A01B 49/027 |
| 2003/0132013 A1 | 7/2003 | Steinlage | | |
| 2008/0066935 A1 * | 3/2008 | Becker | ................ | A01B 63/32 |
| | | | | 172/13 |
| 2009/0272551 A1 | 11/2009 | Thompson et al. | | |
| 2012/0073844 A1 | 3/2012 | Friesen | | |
| 2014/0158386 A1 * | 6/2014 | Payne | ................ | A01B 73/042 |
| | | | | 172/178 |
| 2014/0251646 A1 * | 9/2014 | Gray | ................ | A01B 61/044 |
| | | | | 172/1 |
| 2016/0234994 A1 * | 8/2016 | Gray | ................ | A01B 63/24 |

FOREIGN PATENT DOCUMENTS

| | | |
|---|---|---|
| DE | 102008059144 A1 | 5/2010 |
| EP | 0770319 A1 | 5/1997 |
| EP | 1508264 A2 | 2/2005 |
| EP | 1529430 B1 | 7/2010 |
| UA | 71069 U | 6/2012 |

\* cited by examiner

SOIL TILLING APPARATUS HAVING A COMBING OR LEVELING DEVICE

The invention relates to a soil tilling apparatus having a combing or leveling device according to the preamble of patent claim 1.

Straw combs or towing tools are known, in order to distribute crop residues and in particular left-behind straw after the harvest on the field and to facilitate the subsequent soil tilling and to improve the intermixing process of the crop residues into the soil. Such a straw comb is proposed in the German patent application DE 10 2008 059 144 A 1. A combination of different tools, for example, from combs and subsequent disk harrows is advantageous, in order to carry out the distribution- and mixing work in a passage over the field. Such a combination is described, for example, in the European patent specification EP 1 529 430 B1. Due to the length of the device the vertically permissible height in road traffic is exceeded in the retracted state. In order to limit the overall height of the entire device vertically, the first tine row of the comb can be manually folded back via a plug connection. A further patent application EP 1 508 264 A 2 proposes a disk harrow with upstream straw combs. In order to prevent a clogging of the comb in the case of high straw volume, a control system is provided with detection of the amount of straw and then controlled height adjustment of the comb. This apparatus requires a complex and expensive measurement and control technology.

The problem addressed by the invention is to provide cost effectively and in a simple design a soil tilling apparatus in combination with combing or leveling tools, the intensity or effect of which is adjustable and avoids or prevents a risk of clogging by crop residues.

This problem is solved by the features of the characterizing part of claim 1.

Through the combing tools adjustable at the same time in intensity and attack angle to the soil as well as in the distance to each other or to the soil tilling apparatus or the crossbeams supporting the tools the tool distance is also enlarged with increasing combing aggressiveness. The desired blockage and distribution effect of the individual combing tools no longer influences the further combs or soil tilling tools now trailing at a greater distance. However, precisely in the case of lower intensity or smaller attack angle of the combing tools to the soil a smaller distance of the tools to each other is desirable, in order to attain a better distribution effect in the case of low crop residue stock.

In a particular invention design, the mechanism is designed as a scissor mechanism in the manner of a scissor movement. While the crossbeams supporting the combs function as rotational axes of the scissor kinematics or are in operative connection with the bearing axes of the scissor kinematics, a simultaneous angle adjustment of the transverse axes and the combing tools connected therewith is realized in a simple and cost-effective way through rotation of the crossbeams as well as by translational movement of the crossbeams relative to each other or to the trailing soil tilling tools.

In an expanded design of the invention the mechanism moving the cross beams is designed powered by an external force. Through the use of elastic elements such as springs, fluid cylinders or other adjusting elements exerting external force an evasion or adjustment of the mechanism or the combing tools is ensured in the case of overloading or crashing into an obstacle. An additional adjusting parameter is given for the combing intensity by an external force acting on the mechanism, which force is continuous or adjustable in steps.

In an easy to operate version of the invention one or several fluid cylinders exert an influence on the mechanism, wherein the fluid cylinders are connected with a pneumatic or hydro-pneumatic energy storage. Through this design the actuating power of the fluid cylinders can be set easily by the driver, for example, via a control valve of the towing vehicle. The cylinder force thereby acting on the mechanism can be monitored analogously with a pressure display or be limited with a pressure regulator. Just the same, the fluid cylinder can be pre-loaded in a working direction with a limited pressure and can specify the combing intensity and completely cancel the combing effect with a higher pressure into the other direction, in which the comb is pivoted by the mechanism into an inactive position.

In an improved design of the invention the soil tilling apparatus is provided with a lift-out device, wherein the mechanism is coupled with the lift-out device changing the distance of the crossbeams to the soil tilling tools. Precisely in the case of hitched-up soil tilling apparatuses equipped with a chassis, the length of the drawbar, with which the apparatus is attached to the towing vehicle, influences the mobility of the entire combination. If during the lift-out of the device the distance of the crossbeams to the trailing soil tilling tools is reduced to a minimum value, the towing vehicle when turning can turn nearly 90° to the drawbar, without touching the combing tool or the crossbeams. The drawbar length can be kept lower by this distance and the mobility of the entire combination improves. The coupling between mechanism on the one hand and chassis, drawbar or lifting device can thereby take place either mechanically via a transmission rod, a wire-rope or chain hoist or via a hydraulic coupling of different actuating motors or cylinders.

In an easy to operate design of the invention the distance of the crossbeams to the soil tilling tools is designed to be lockable at a minimum value or value range. By locking the mechanism or the crossbeams at a minimum distance position to the soil tilling tools the combing tools can remain in a nearly ineffective position on the soil tilling apparatus, if they are not needed, rather than dismantling them.

In a further design of the invention the soil tilling apparatus is provided with a semi-mounted chassis and a towing hitch for coupling the soil tilling apparatus to a towing vehicle, wherein the towing hitch is equipped with a device, which detects the steering movements between towing vehicle and soil tilling apparatus and transmits them into a movement on the mechanism and is designed changing the distance of the crossbeams to the soil tilling tools. For example, with drag link or drawbars or other devices the distance of the combing tools to the trailing soil tilling tools can be reduced at large steering angles of the steering towing vehicle, in order to avoid a collision with the towing vehicle. As already previously mentioned, the overall length of the drawbar and thus the length of the entire combination of the towing vehicle and apparatus can be reduced and thus the mobility improved. In the case of an optional equipment of the soil tilling apparatus with comb a longer drawbar does not need to be provided.

In an expanded form of the invention the combing tools are mounted self-resiliently or equipped with a spring device on the crossbeams. If individual combing tools encounter an obstacle, they can evade it by moving backwards, without adjusting the combing direction in its entirety. Just the same, an individual protection of the crossbeams for the mechanism is conceivable.

In another form of the invention the combing tools are designed as tine tools or as wide leveling tools. In particular, with robust tine shapes or with wide leveling tools a distribution or a leveling of loose soil can also occur. This also serves to prepare the subsequent soil tilling. The combing tool can also be a continuous leveling bar.

In a further form of the invention the mechanism, the crossbeams or the combing tools are provided with a reversing lock, which brings about the evasion of the combs upon movement or stress contrary to the driving direction. Through this device the combing tools fold away upon contact with the soil and inadvertent backward movement of the soil tilling apparatus and do not insert any crop residues or straw. At the same time an overload of the tools and the comb adjustment is prevented. The reversing lock can be designed as shear protection, with frictional locking- or spring effect.

The invention is characterized in particular in that a mechanism brings about an enlargement of the distance of the crossbeams and thus the combing tools to each other or to the trailing soil tilling tools through the rotation of the crossbeams with increasingly steeper attack angle of the combing tools mounted on the crossbeams to the soil. If this adjustment mechanism is combined with the lift-out device of the soil tilling apparatus, the outreach of the comb mounted on the soil tilling apparatus forwards is reduced and makes possible a maximum steering angle of the towing vehicle close to the drawbar of the soil tilling apparatus, without damaging the combs upon turning. Through this advantageous combination the driver is released from operation of the apparatus and can dedicate his full attention to an optimal distribution- and work result of the apparatus.

Further details and advantages of the subject matter of the invention result from the following description and the associated drawings, in which an embodiment is depicted with the details and individual parts necessary for this purpose.

DESCRIPTION OF THE FIGURES

Figure 1:
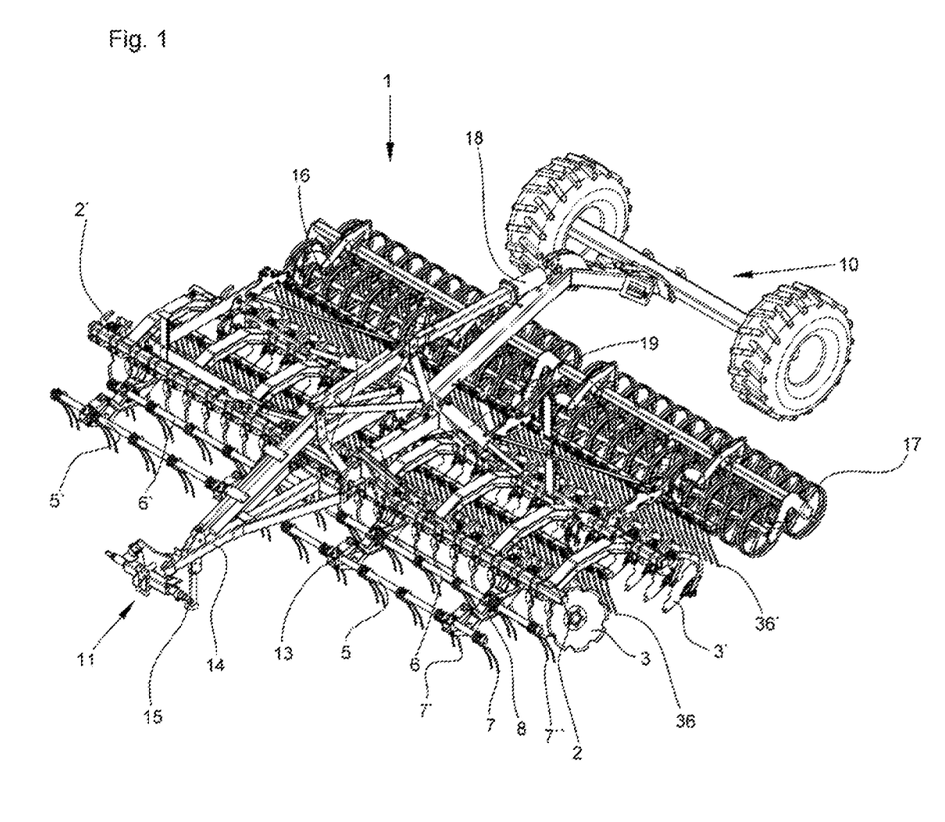
FIG. 1 shows a drawn soil tilling apparatus with upstream combing assembly in a perspective representation.

FIG. 1 shows a drawn semi-mounted soil tilling apparatus 1, here a short disk harrow. Likewise, other apparatus designs such as, for example, tine cultivators, but also driven rotary harrows, tine- or milling rotors are included. The soil tilling apparatus is coupled via towing hitch 11 to the lower links of a tractor not depicted as a traction engine. The lower links are components of a three-point power lift of the tractor, with which the apparatus can be lifted out in the front area. The coupling to the lower link occurs through a slide shaft oscillating axially in the driving direction, which is limited in its movement laterally by rubber buffers against tilting of the entire apparatus. On the back sides, the towing hitch 11 is rotatably or pivot-mounted via a vertical axis of rotation. Likewise the towing hitch 11 can be designed as a three-point tower for coupling to upper- and lower links of the three-point hydraulic system of the tractor and is then fastened cardanically or via a ball joint to the drawbar 14. On its other end, the drawbar 14 is attached via a mounting trestle 16 to the mid-frame 13 of the soil tilling apparatus 1. Likewise, the drawbar 14 can be attached without the towing hitch 11 by means of a drawbar eye or a ball-head coupling directly in a towing hitch or an adjustable drawbar of the tractor. In this case, the drawbar 14 with a hydraulic cylinder is braced against the mounting trestle, in order to lift the apparatus out forward. On the back end of the mid-frame 13, the chassis 10 is fastened vertically pivotable via a transverse axis. Via a hydraulic cylinder 18 and further struts the chassis can be swung against the mid-frame and thus the entire apparatus can be lifted out over the soil 35. In the operating position the chassis 10 is lifted out by the hydraulic cylinder 18 freely suspended over the soil 35. In this case the depth guidance of the soil tilling apparatus 1 occurs through the height-adjustable rollers 17. Likewise, a direct attachment of the soil tilling apparatus 1 to the three-point hydraulic system of the tractor is possible. In this case, towing hitch 11, drawbar 14 and chassis 10 are omitted. Instead upper and lower links of the tractor are fastened directly above and below to corresponding coupling points of the mounting trestle 16.

To the right and left of the mid-frame 13 two support frames 2, 2' extend. The two support frames are pivot-mounted to the mid-frame via a pivot axis, which runs parallel to the driving direction and can be pivoted by one or several hydraulic cylinders from a vertical transport position into a horizontal operating position. Likewise, a rigid design with a continuous support frame is conceivable as well as support frames consisting of segments. The support frame consists primarily of supporting tubes spaced apart in the driving direction for the mounting of the soil tilling tools 3, 3' as well as required connecting parts.

In the front area of the support frames rotating soil tilling tools 3 laterally spaced apart from each other are fastened in a specific direction. In the back area of the support frame a further set of soil tilling tools 3' follows with an opposite working direction. Behind the rotating soil tilling tools 3, impact tools 36, 36' follow for the optimal distribution of the thrown-up earth.

In front of the support frames 2, 2', in each case a mechanism 8 in the form of a multiple scissor joint are attached, which bear the subsequently described crossbeams 5, 6 and combing tools 7, 7'.

Figure 2:
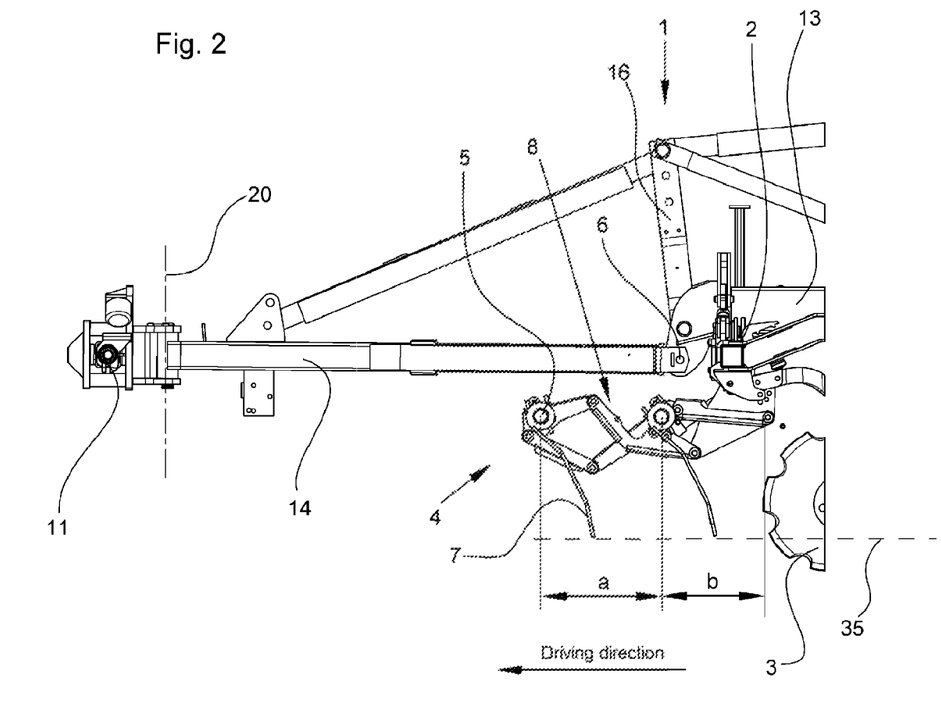
FIG. 2 shows the front part of the soil tilling apparatus with drawbar attachment and combing assembly.

FIG. 2 shows the front area of the soil tilling apparatus 1 with drawbar attachment 14 and combing assembly. The vertical axis 20 can be seen here, which the towing hitch 11 pivots relative to the drawbar 14 and makes possible a steering angle of the towing vehicle to the soil tilling apparatus 1 for driving around curves and turns. On the support frame 2, 2' the mechanism 8 is fastened by means of a flange connection to the respective support frame 2, 2'. In particular, the bearing pockets of the trailing soil tilling tools 3 offer themselves as a fastening unit. However, in addition to a detachable connection, welded fastening brackets also offer themselves. The arrangement of mechanism 8 can occur individually as well as several times side by side.

Figure 3:
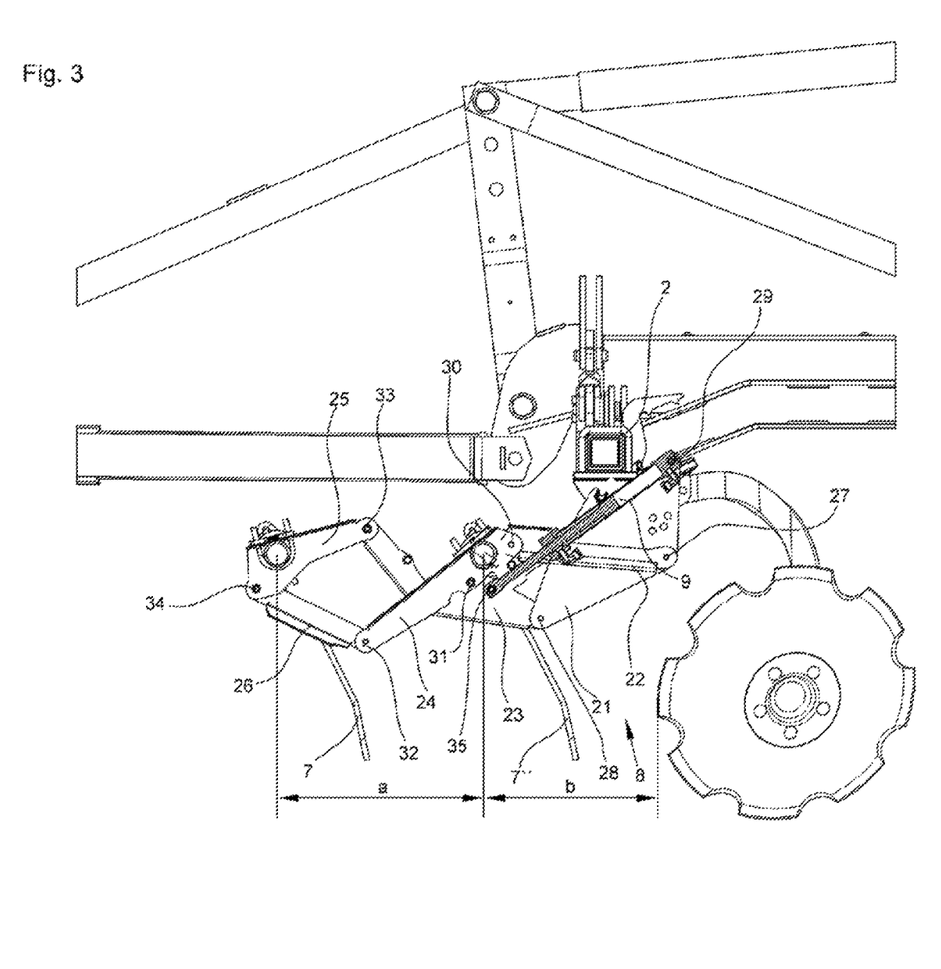
FIG. 3 shows a lateral cross section through the mechanism of the combing adjustment.

FIG. 3 shows a lateral cross section through the mechanism 8 of the combing adjustment, as already depicted in FIG. 2. The mechanism 8 is fastened with one or several brackets 21 underneath the support frame 2 by means of a flange connection. With the bracket 21 a first link 22 and a lever 23 is in each case connected pivotably about the axes 27 and 28. Between the bracket 21 and the lever 23 a fluid cylinder is movably arranged on the axes 29 and 35. If the fluid cylinder 9 on its piston side is pressurized, it pivots the lever 23 downwards. The fluid cylinder acts oppositely, if its piston ring side is pressurized. Via the axes 30 and 31 the back tool link 24 is connected movably with the link 22 and the lever 23. In the back tool link 24 a cross beam 6 is clamped resistant to torsion. Likewise, a positive connection is possible. On the crossbeam 6 several combing tools 7" are fastened laterally spaced apart from each other positively on the crossbeams with a robust cotter pin. By pivoting of the lever 23 the back tool link 24 and thus the crossbeam 6 fastened thereto at the same time carries out a rotatory as well as translational movement. On the respective front end of the lever 23 or the back tool link 24 a front tool link 25 and a further line 26 is connected movably via the axes 32 and 33. About the axis 34 the front tool link 25 and the link 26 can rotate relative to each other. In the same manner as on the back tool link 24 on the front tool link 25 a further crossbeam 5 is fastened, on which further combing tools 7, as previously described, are arranged. All bearing positions of the aforementioned axes can be mounted in single- or multiple shear. It goes without saying that the mechanism 8 can be arranged as such in an individual assembly as well as multiply as such side by side transversely to the driving direction on the respective support frame 2, 2'. This also applies to the individual levers and links 22-26 as well as bearing bracket 21. Also a separate design, wherein individual components are arranged spaced apart transversely to the driving direction is conceivable. With pivoting of the back lever 23 by the fluid cylinder 9 the front tool link 25 is also moved translationally and at the same time rotationally. The crossbeam 5 and the combing tools 7 also perform this movement. Through this kinematic arrangement of the aforementioned link and lever, the crossbeams 5, 6 twist at approximately the same angle about their own axis transversely to the driving direction. With twisting of the crossbeams 5, 6 the distance a of the crossbeams 5, 6 to each or the distance b of the back crossbeam 6 to the soil tilling tools 3 changes at the same time and continuously.

The greater the force is, with which the fluid cylinder presses on the lever 23, the steeper the combing tools line up at an angle to the soil 35 and increase their combing intensity. At the same time, the distances a and b increase and subsequently the distance of the contact points of the respective tools on the soil 35. If the fluid cylinder now generates a tractive force on the lever, the entire mechanism 8 folds together into a minimal length in the vicinity of the support frame 2. The distances a and b or the sum of the distances a and b are minimized and the combing tools pivot into a compact outer operating position.

Figure 4:
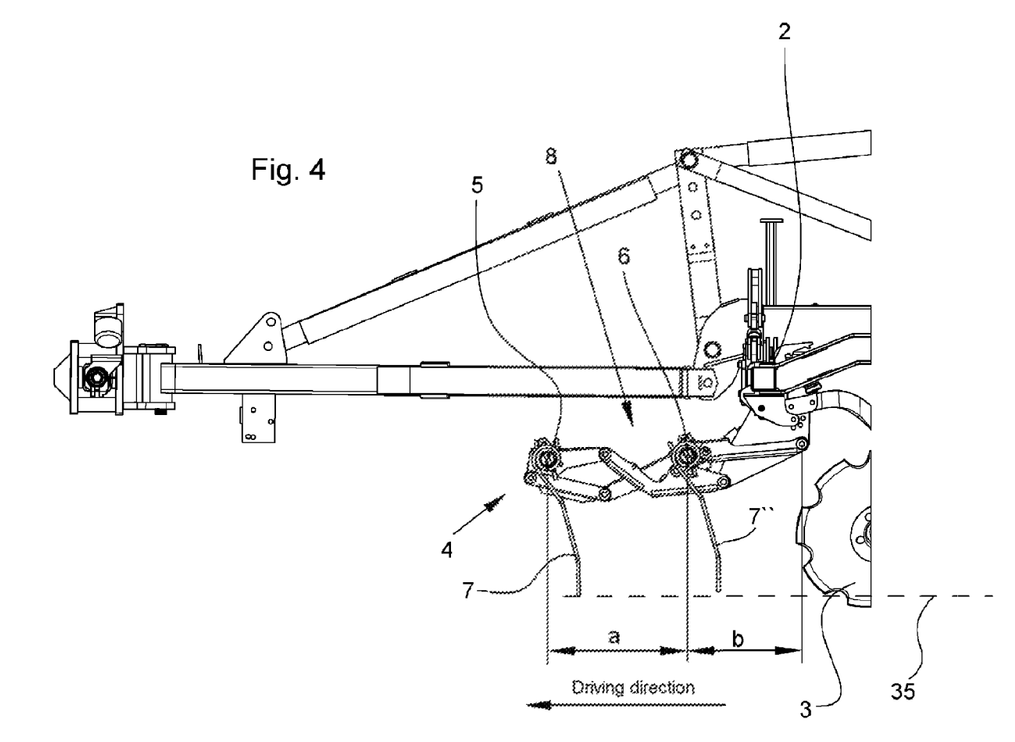
FIG. 4 shows the mechanism of the combing assembly in maximum outreach or intensity and FIG. 5 shows the mechanism of the combing assembly in inactive position or turning- or transport position.

FIG. 4 shows the mechanism of the combing assembly in lateral view in maximum outreach or intensity. The levers and links 22-26 of the mechanism 8 are stretched flatly forward to such an extent that a sufficient stability of the mechanism 8 still results in particular against vertical stress. The approximately perpendicular position of the combing tools to the soil 35 is discernible as well as the max. distances a/b of the crossbeam 5 and 6 to each other or to the trailing soil tilling tools 3. The distances a/b of the crossbeams 5 and 6 to each other or to the trailing soil tilling tools 3 correspond approximately to the same distances in the driving direction, with which the lower ends of the combing tools 7, 7' are spaced apart from each other or from the soil tilling tools 3.

Figure 5:
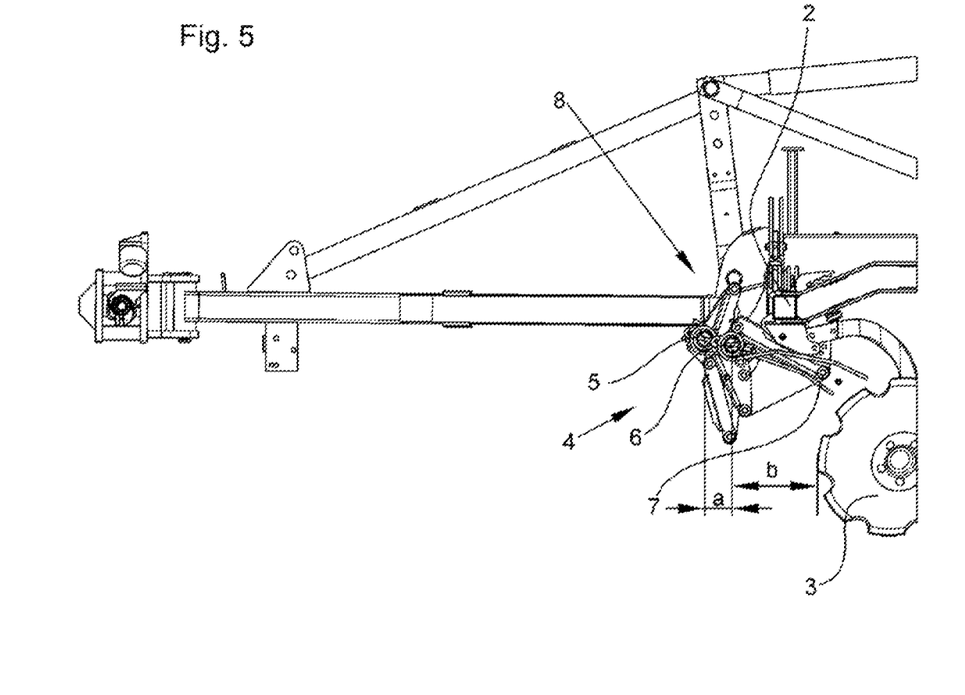

FIG. 5 shows the mechanism 8 of the combing- or leveling device 4 in inactive position or turning or transport position. Through the shortest outreach of the combing- or leveling device 4, which is formed from the sum of the distances a and b, a maximum steering angle of the towing vehicle to the drawbar of the soil tilling apparatus is possible, without the outer contour, in particular the tires of the towing vehicle touching the components of the combing- or leveling device 4.

A sheet with drawings follows.

LIST OF REFERENCE SIGNS

| | |
|---|---|
| 1 | Soil tilling apparatus |
| 2 | Support frame |
| 3 | Soil tilling tools |
| 4 | Combing or leveling device |
| 5 | Crossbeam |
| 6 | Crossbeam |
| 7 | Combing tools |
| 8 | Mechanism |
| 9 | Fluid cylinder |
| 10 | Chassis |
| 11 | Towing hitch |
| 12 | Lift-out device |
| 13 | Mid-frame |
| 14 | Drawbar |
| 15 | Slide shaft |
| 16 | Mounting trestle |
| 17 | Rollers |
| 18 | Hydraulic cylinder |
| 19 | Hydraulic cylinder |
| 20 | Axix |
| 21 | Bearing bracket |
| 22 | Link |
| 23 | Lever |
| 24 | Rear tool link |
| 25 | Front tool link |
| 26 | Link |
| 27-34 | Axis |
| 35 | Soil, soil surface |
| 36 | Impact tools |

The invention claimed is:

1. A soil tilling apparatus moved or driven by a vehicle, with one or several support frames and soil tilling tools mounted thereon, which are arranged preferably in one or several rows spaced apart from each other sideways to the driving direction, with a combing or leveling device, which is upstream of the soil tilling tools at a distance in the driving direction and consists of crossbeam arranged movably, wherein combing tools are mounted spaced laterally apart from each other on the at least one crossbeam, wherein the cross beams are hinged in a mechanism in a rotatory manner by their movement changing the combing intensity or the attack angle of the combing tools to the soil,
  characterized in that the mechanism in its movement is designed to adjust at a same time changing, a distance between immediately adjacent ones of the crossbeams to each other or to the soil tilling tools preferably in the driving direction and simultaneously the attack angle of the combing tools,
  wherein, the mechanism is designed as a scissor mechanism in the manner of a scissor movement, wherein the crossbeams are fixed to respective tool links, the tool links being pivotably hinged to at least two connected links about axis extending therebetween each of the axis spaced apart from the cross beams, and
  wherein the mechanism is designed powered by an external force moving the at least one crossbeam.

2. A soil tilling apparatus according to claim 1, characterized in that one or several fluid cylinders act on the mechanism, wherein the fluid cylinder is connected with at least one pneumatic or hydro-pneumatic energy storage.

3. A soil tilling apparatus according to claim 1, characterized in that the soil tilling apparatus is provided with a lift-out device, wherein the mechanism is coupled with the lift-out device changing the distance of the cross beams to the soil tilling tools.

4. A soil tilling apparatus according to claim 1, that the distance (a, b) of the at least one crossbeam to the soil tilling tools is designed to be lockable at a minimal value or value range.

5. A soil tilling apparatus according to claim 1, characterized in that the soil tilling apparatus is provided with a chassis and a towing hitch for coupling the soil tilling apparatus to a towing vehicle, wherein the towing hitch is equipped with a device, which detects the steering movements between towing vehicle and soil tilling apparatus and transfers them into a movement on the mechanism and is designed changing the distance of the cross beams to the soil tilling tools.

6. A soil tilling apparatus according to claim 1, characterized in that the combing tools are mounted on the cross beams self-resiliently or equipped with a spring device.

7. A soil tilling apparatus according to claim 1, characterized in that the combing tools are designed as tine tools or as wide leveling tools.

8. A soil tilling apparatus according to claim 1, characterized in that the mechanism, the cross beams or the combing tools are provided with a reversing lock, which brings about the evasion of the comb upon movement or stress contrary to the driving direction.

9. A soil tilling apparatus according to claim 1, wherein the at least one crossbeam includes a first cross beam and a second cross beam, characterized in that the mechanism includes a front tool link with the first cross beam fixedly coupled thereto, a rear tool link with the second cross beam fixedly coupled thereto, a link pivotably coupled to the front tool link on a first side of the first cross beam and a lever pivotably coupled to the front tool link on a second side of the first cross beam, the link pivotably coupled to the rear tool link at a first end thereof, with the lever pivotably coupled to the rear tool link between the first end thereof and the second cross beam, with the lever pivotably coupled to a bracket fixedly coupled to the support frame, and with a second link pivotably coupled to a second end of the rear tool link and pivotably coupled to the bracket.

10. A soil tilling apparatus according to claim 1, wherein the at least one crossbeam includes a first cross beam and a second cross beam, characterized in that the mechanism includes a front tool link with the first cross beam fixedly coupled thereto, a rear tool link with the second cross beam fixedly coupled thereto, the front tool link pivotably coupled to the rear tool link through a link pivotably coupled to each of the front tool link and the rear tool link and a lever pivotably coupled to each of the front tool link and the rear tool link.

11. A soil tilling apparatus according to claim 10, characterized in that the link is pivotably coupled to the front tool link on a first side of the at least one crossbeam with the lever pivotably coupled to the front tool link on a second side of the at least one crossbeam.

12. A soil tilling apparatus according to claim 1, wherein the at least one crossbeam includes a first cross beam and a second cross beam, characterized in that the mechanism includes a front tool link with the first cross beam fixedly coupled thereto, a rear tool link with the second cross beam fixedly coupled thereto, the front tool link pivotably coupled to the rear tool link through a lever and another link, wherein the lever and the another link are pivotably coupled to each of the front tool link and the rear tool link.

\* \* \* \* \*